United States Patent [19]
Smemo

[11] 3,954,146
[45] May 4, 1976

[54] TRANSMISSION CONTROL LINKAGE

[75] Inventor: Alfred Sigmund Smemo, Dubuque, Iowa

[73] Assignee: Deere & Company, Moline, Ill.

[22] Filed: May 19, 1975

[21] Appl. No.: 578,687

Related U.S. Application Data
[63] Continuation of Ser. No. 464,310, April 26, 1974, abandoned.

[52] U.S. Cl. ............................... 180/77 R; 74/531
[51] Int. Cl.² ............................................ F16C 1/18
[58] Field of Search ............ 180/77, 6.48; 188/72.2, 188/72.7; 74/504, 531

[56] References Cited
UNITED STATES PATENTS

| | | | |
|---|---|---|---|
| 2,197,290 | 4/1940 | Baker et al. | 180/77 R |
| 2,378,688 | 6/1945 | Codlin | 74/531 |
| 2,382,330 | 6/1945 | Pain | 74/531 |
| 2,749,825 | 6/1956 | Hirasuna | 74/531 X |
| 3,477,308 | 11/1969 | Wagstaff | 74/504 |
| 3,605,903 | 9/1971 | Glesmann | 180/77 R X |
| 3,828,624 | 8/1974 | Weigand | 74/504 X |

*Primary Examiner*—M. H. Wood, Jr.
*Assistant Examiner*—R. Schrecengost

[57] ABSTRACT

A vehicle, such as a crawler tractor or the like, includes separate reversible hydrostatic transmission units which are adapted for driving the tracks of the tractor. The transmission units are controlled through means including a valve assembly actuated by a first manually operable linkage for simultaneously effecting changes in the speed and direction of rotation of the units, and through means of a pair of second manually operable linkages for in effect overriding the transmission condition selected by the first manually operable linkage by selectively retarding the speed of and/or changing the direction of rotation of the hydrostatic motors for effecting steering of the vehicle.

15 Claims, 5 Drawing Figures

3,954,146

TRANSMISSION CONTROL LINKAGE

This is a continuation of application Ser. No. 464,310, filed Apr. 26, 1974, and now abandoned.

BACKGROUND OF THE INVENTION

The present invention relates to a transmission valve control linkage and more particularly relates to a manually actuatable linkage for simultaneously effecting speed and direction control of a pair of reversible hydrostatic transmission units comprising final drive transmissions of a track-laying vehicle.

The simultaneous control of the speed and direction of rotation of hydrostatic transmission units is normally accomplished through valve means including a manually actuated valve element which is movable in opposite directions from a neutral position for respectively effecting opposite directions of rotation in the transmission units and for metering flow to the units such that their speed will increase as the element is increasingly displaced from its center position. Heretofore, the correct positioning of the valve element so as to effect a desired transmission condition has required the visual attention of the operator and this requirement for visual attention is not entirely satisfactory since the operator normally has other operations which also require his visual attention.

SUMMARY OF THE INVENTION

According to the present invention there is provided a novel manual control linkage for controlling valve means for in turn controlling the operation of a pair of reversible hydrostatic transmission units.

It is a broad object of the invention to provide manually operable linkage means for actuating a valve means for controlling the speed and direction of rotation of a pair of hydrostatic transmission units, the linkage means including means by which it is possible to effect a desired condition in the units without necessitating the visual attention of the operator. More specifically, it is an object of the invention to provide such a linkage means which includes variable resistance means requiring varying operator effort to be exerted for achieving various desired transmission conditions.

Still a more specific object is to provide a manually operable linkage means, as aforementioned, which includes a core plate connected to a hand lever and to the control valve for the motors and sandwiched between base and pressure members having bearing surfaces arranged relative to bearing surfaces of the core plate such that the movement arm of the frictional force resisting movement of the plate is at a minimum when the lever is at a neutral position corresponding to a neutral condition of the transmissions, the movement arm gradually increasing as the lever is increasingly displaced in opposite directions from its neutral position to establish maximum forward and maximum rearward driving speeds of the transmissions.

These and other objects of the invention will become apparent from a reading of the following description in conjunction with the appended drawings.

DESCRIPTION OF THE PREFERRED EMBODIMENT

Figure 1:
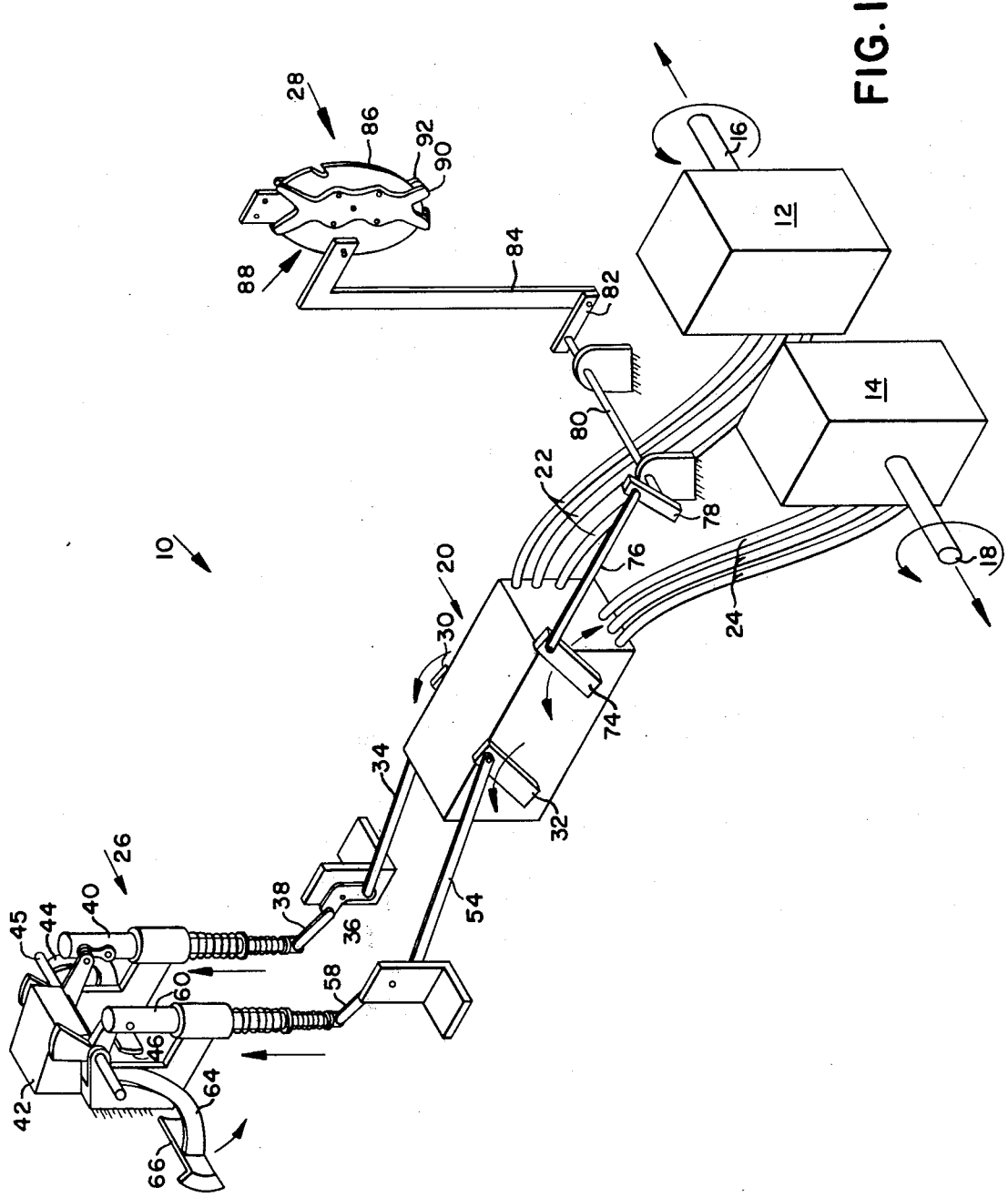
FIG. 1 is a perspective schematic representation of the control system embodying the manual control linkage constructed according to the principles of the present invention.

Referring now to FIG. 1, a control system embodying the present invention is indicated in its entirety by the reference numeral 10. The system 10 includes right and left hydrostatic transmission units 12 and 14, respectively, including right and left output shafts 16 and 18 which are adapted for connection to track drive sprockets of the vehicle (not shown). Working fluid for driving the transmission units 12 and 14 is routed thereto through means of a control valve 20 connected to the units 12 and 14 through means of right and left sets of fluid lines 22 and 24, each set of fluid lines including two which are alternately selectively connected to a source of fluid pressure and a reservoir through means of the valve 20 and a third line which is connected to a respective crankcase (not shown) of the transmission units 12 and 14 so as to drain fluid therefrom. For the purpose of selectively actuating the valve 20 for controlling the routing of working and return fluid to and from the transmission units 12 and 14, there is provided steering controls, indicated generally at 26, and speed and direction controls, indicated generally at 28.

Steering of the vehicle is accomplished by slowing one or the other of the hydrostatic transmission units 12 and 14. For example, to make a right turn, the right unit 12 would be slowed and to make a left turn, the left unit 14 would be slowed. To accomplish this selective slowing of the hydrostatic motor units 12 and 14, the control valve 20 includes right and left valve elements (not shown) respectively having right and left control arms 30 and 32 connected thereto for rotating the same upon pivotal movement of the arms. The steering controls 26 include similar right and left sets of linkages for respectively displacing the arms 30 and 32 angularly in the direction of the arrow 33. Specifically, the right set of linkages includes a link 34 having its opposite ends connected to the right arm 30 and one leg of a bell crank 36. One end of a short link 38 is pivotally connected to the other leg of the bell crank 36 and the other end of the link 38 is pivotally connected to the bottom end of a rod 40 which is reciprocally mounted in a fixed member 42. A foot pedal 44 is pivotally mounted on a transverse shaft 45 and has a forwardly projecting arm linked to the rod 40 at a location adjacent its top end. The foot pedal 44 has a foot-engageable pad 46 at its lower end. It will be appreciated then that depression of the pad 46 will cause the rod 40 to be moved upwardly which in turn causes the right arm 30 of the control valve 20 to be swung forwardly in the direction of the arrow 33.

The left set of linkages of the steering controls 26 includes a connecting link 54 having its opposite ends respectively pivotally connected to the left valve arm 32 and one leg of a bell crank (not shown) similar to the bell crank 36. A short link 58 is pivotally interconnected between the other leg of the bell crank and the bottom end of a rod 60 which is reciprocally mounted in the fixed member 42. A foot pedal 64 is pivotally mounted on the shaft 45 and includes a forwardly projecting arm linked to the rod 60 at a location adjacent its top end. A foot engageable pad 66 is formed at the lower end of the pedal 64.

As the steering controls 26 do not form a part of the present invention, no further description of them is given.

The rotation speed and direction of the right and left hydrostatic transmission units 12 and 14 is controlled through means of a valve element (not shown) having an arm 74 connected thereto and swingable fore and aft from a neutral position, shown in FIG. 1, for respectively effecting increasing forward and increasing rearward driving speeds in the units 12 and 14. Motion is transmitted to the arm 74 through means of a fore and aft extending connecting link 76 having its opposite ends respectively pivotally connected to the upper end of the arm 74 and to the upper end of a crank arm 78 fixed to the left end of a crankshaft 80 having a further crank arm 82 secured to its right end. An upwardly extending link 84 has its opposite ends respectively connected to thet outer end of the crank arm 82 and to a core plate 86 of a hand lever assembly including a variable resistance generating structure indicated generally at 88.

As can best be seen in FIGS. 2–5, the core plate 86 of the member 88 is sandwiched between a base member 90 and a pressure applying member 92. The base member 90 is fixed to a vertically extending support member 94 through means of a plurality of cap screws 96 which extend through the member 94 and are threadedly received in respective threaded bosses 98 formed on the base member 90. As viewed in FIG. 3, the core plate 86 is provided at its upper right and left sides with vertically elongated rectangular bearing surfaces 100 and 102, respectively, and is provided at its lower right and left faces with vertically elongated rectangular bearing surfaces 104 and 106, respectively. The bearing surfaces 100, 102, 104 and 106 may be constructed of a friction material of the type typically used for constructing brake linings and the like. The base member has upper and lower V-shaped bearing surfaces 108 and 110, respectively, engaged with the upper and lower left bearing surfaces 102 and 106 of the core plate 86 and similarly the pressure applying member 92 has upper and lower V-shaped bearing surfaces 112 and 114, respectively, in engagement with the upper and lower right bearing surfaces 102 and 104 of the core plate 86. Extending centrally through the core plate 86 and the pressure applying member 92 is a shaft 116 having its left end, and viewed in FIG. 3, secured in the right surface of the base member 90 through means of a capscrew 118. The core plate 86 is rotatably mounted on the shaft 116 through means of a roller bearing assembly 120. The pressure applying member 92 is axially shiftably mounted on the shaft 116 and for the purpose of biasing the pressure applying member 92 into engagement with the core plate 86, a coil compression spring 122 is mounted on the shaft 116 and is compressed between the member 92 and a washer 124 mounted on the shaft and is held in selected adjusted positions through means of a locknut assembly 126. For maintaining the upper V-shaped surfaces and lower V-shaped surfaces of the base member 90 and pressure applying member 92 in proper facing relationship with each other and for preventing the pressure applying member 92 from rotating relative to the base member 90, the base member 90 and pressure applying member 92 are provided with aligned openings which receive a pilot pin 128 that extends transversely through an arcuate opening 129. It will be appreciated then that the core plate 86 may be rotated about the axis of the shaft 116 while the angular relationship to the base and the pressure applying members 90 and 92, respectively, remain the same relative to the shaft.

A transmission ratio selector or shift lever 130 is connected to the top of the core plate 86 by means of a connection structure 132. As is well known in the art, the lever 130 projects through a guide slot formed in a plate 134, the slot acting to guide the lever fore and aft from a central neutral position to effect desired forward and rearward driving ratios in the transmission units 12 and 14.

Figure 2:
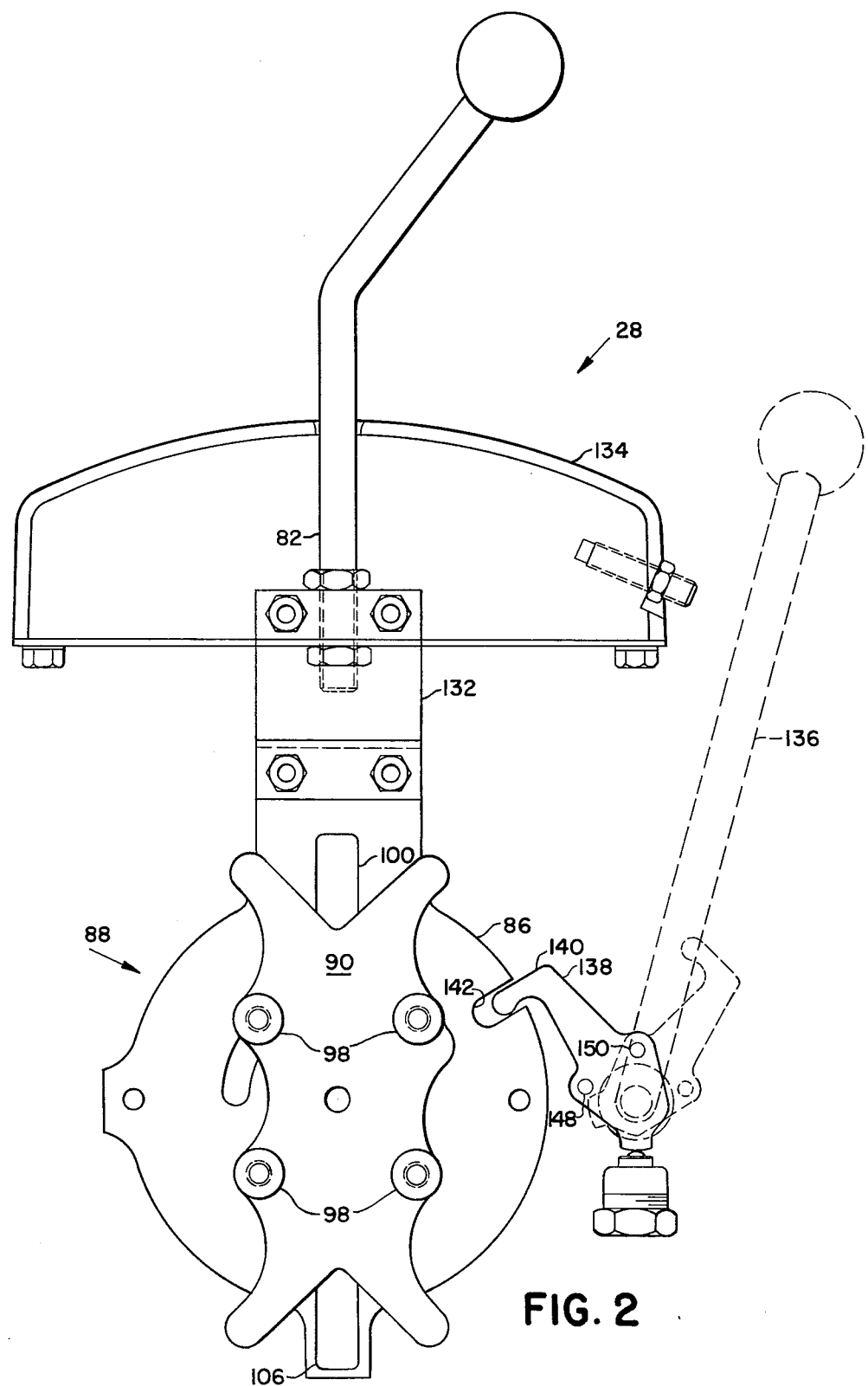
FIG. 2 is a side elevational view of a portion of the manual control linkage shown in FIG. 1.
Figure 4:
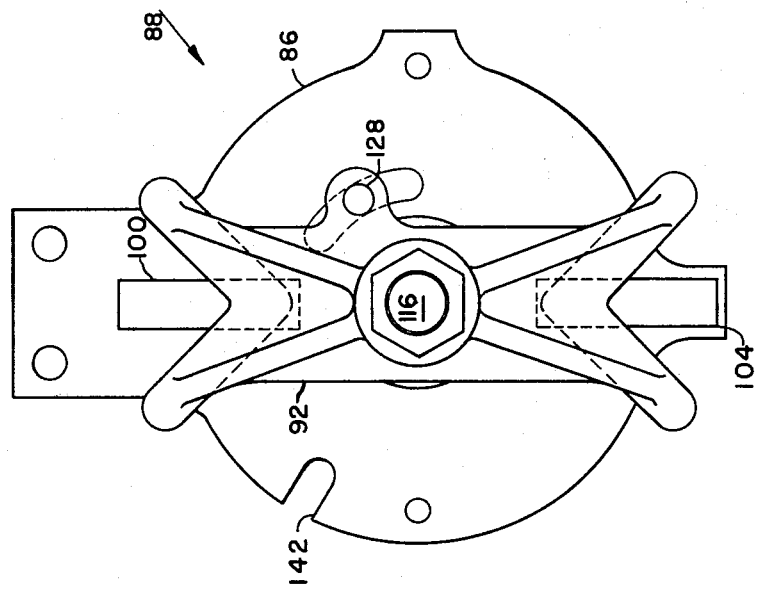
FIG. 4 is a side elevational view of the variable resistance generating structure shown in FIG. 3.
Figure 3:
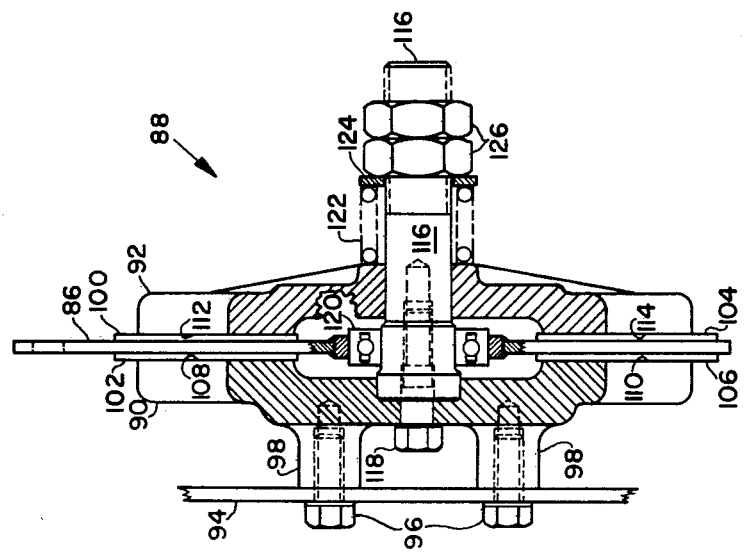
FIG. 3 is a partial vertical sectional view of the variable resistance generating structure of the present invention and additionally showing a mounting plate for supporting the structure.
Figure 5:
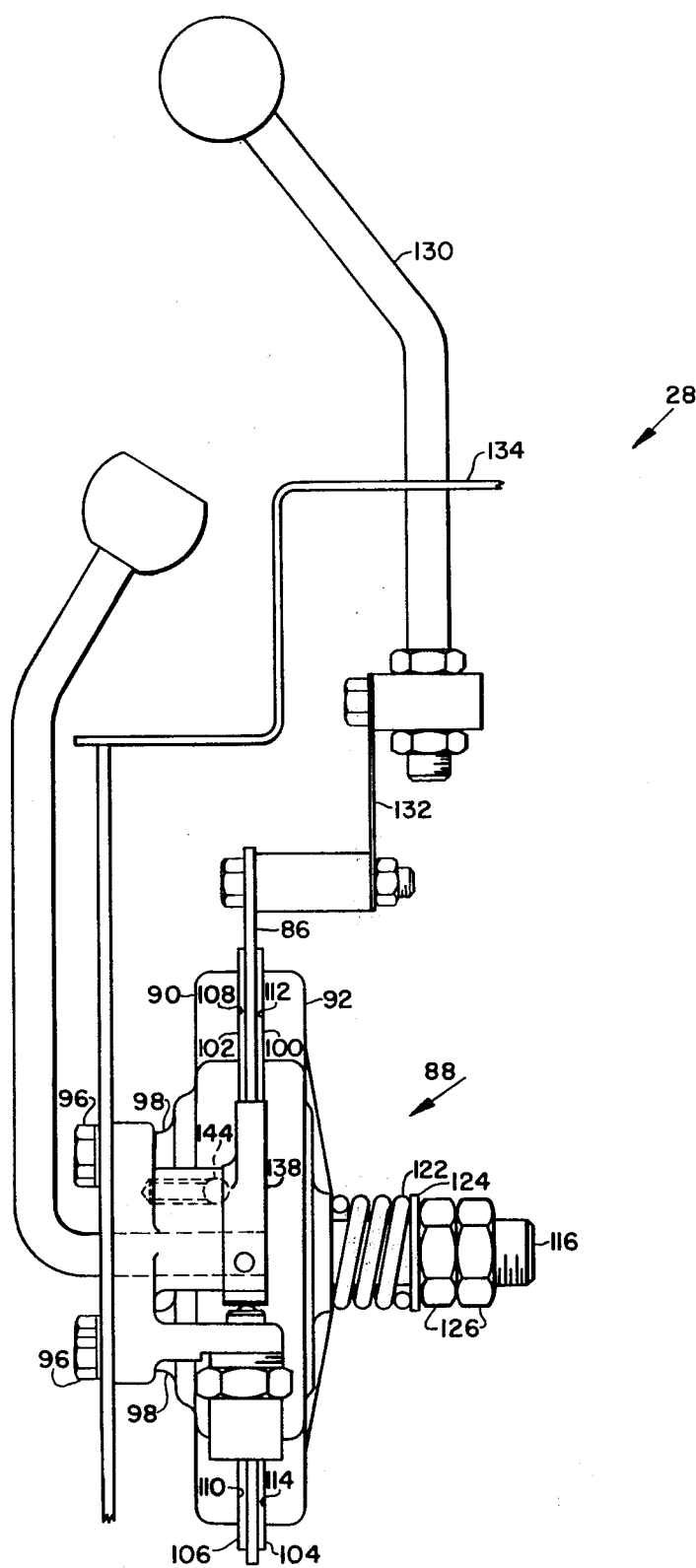
FIG. 5 is a rear elevational view of the control linkage shown in FIG. 2.

Disposed adjacent the core plate 86 of the structure 88 is a latch operating lever 136 having a latch member 138 fixed for rotation with a horizontally angled lower end of the lever for movement between a latched position, wherein an angled end 140 of the member 138 is received in a notch 142 formed in periphery of the core plate 86 and an unlatched position, wherein the end 140 of the latch member is displaced angularly from its latched position, as shown in dashed lines in FIG. 2. The latch member 138 is respectively held in its engaged and disengaged positions through means of a spring loaded ball 144 mounted so as to bearing engagement with the left surface 136 of the latch member 138, as viewed in FIG. 5, the ball 144 respectively engaging first and second spherical recesses 148 and 150 when the latch member 138 is in its latched and unlatched positions.

The operation of the speed and direction control 28 is as follows. Assuming that the selector lever is in the neutral position shown in FIG. 2, the vehicle will be at rest since the transmission units 12 and 14 will be in corresponding neutral conditions. If it is then desired to drive the vehicle forwardly at a preselected speed, the operator need only to move the shift lever 130 a predetermined distance forwardly. As the lever moves, the core plate 86 is rotated counterclockwise and this motion is transmitted to the valve control arm 74 through means of the links 84, crankshaft 80 and fore-and-aft link 76. This motion of the valve control arm results in pressure and return fluid passages being connected to the transmission units so as to cause the latter to be driven in the forward direction at a predetermined speed. AS the core plate is rotated counterclockwise by the lever 130, the bearing or friction surfaces 100 and 102 of the core plate will respectively move outwardly on one leg of each of the upper V-shaped surfaces 108 and 112 of the base and pressure members 90 and 92, respectively. At the same time, the lower left and right bearing or friction surfaces 104 and 106 of the core plate 86 will move outwardly on one of the opposed legs of the lower V-shaped surfaces 110 and 114 of the base and pressure applying members 90 and 92, respectively. Accordingly, as the core plate 86 is rotated away from its neutral position the resistance to rotation will increase due to the fact that the locations of bearing engagement between the core plate and the base and pressure applying members 90 and 92 will be located farther away from the center of rotation defined by the shaft 116. Since the operator has his hand on the lever 130, he will feel the change in resistance to the movement of the lever and through experience he will be able to position the lever in a desired position for effecting a desired drive ratio in the transmission units 12 and 14 without needing to look at the lever while changing the transmission ratio.

Due to the fact that the bearing surfaces of the base and pressure applying members 90 and 92 are symmetrical relative to the bearing surfaces of the core plate 86 when the latter is in its neutral position, the operation for effecting a desired reverse driving ratio in the transmission units is similar to that just described for effecting forward driving conditions except that the shift lever 130 will be moved rearwardly to cause clockwise rotation of the core plate 86, as viewed in FIGS. 1 and 2.

If it is desired to lock the shift lever 130 in its neutral position, the operator may do so by rotating the latch operating lever 136 so as to bring the end 140 of the latch member 136 into engagement with the notch 142 in the core plate 86.

I claim:

1. A manually operable linkage for controlling the operation of a hydrostatic transmission among neutral, forward and reverse driving conditions, comprising: a first member mounted for pivotal movement about and axial movement along a fixed axis; said first member being angularly shiftable in opposite first and second directions from a neutral position, wherein said neutral condition is established in the transmission, to first and second sets of positions respectively wherein forward and reverse driving conditions are established in the transmission, the speed of the transmission increasing as the angular distance of the first member from its neutral position increases; a second member being fixed alongside said first member; biasing means acting against said first member and engaging a first bearing surface means thereof with a second bearing surface means of said second member; and said first and second bearing surface means cooperating to define frictional resistance means for increasingly resisting movement of said first member in said first and second directions from said neutral position as the angular displacement of the first member from its neutral position increases.

2. The manually operable linkage defined in claim 1 wherein said biasing means includes a spring acting on a third member mounted for axial movement along said axis and engaged with said first member on a side opposite from that against which the second member bears.

3. The manually operable linkage defined in claim 1 wherein said first bearing surface means of said first member extends radially relative to said fixed axis and is in constant engagement with said second bearing surface means; and said second bearing surface means of said second member having a shape which is symmetrically disposed relative to said second first bearing surface means only when the first member is in its neutral position.

4. The manually operable linkage defined in claim 3 wherein said first bearing surface means includes at least one radially elongated rectangular surface spaced from one side of said axis; and said second bearing surface means including at least one radially outwardly opening V-shaped surface respectively engaging a radially inner portion of said rectangular surface when the first member is in its neutral position.

5. The manually operable linkage defined in claim 4 wherein said first and second bearing surface means respectively include second radially elongated rectangular V-shaped surfaces located diametrically opposite from the first mentioned rectangular and V-shaped surfaces.

6. A manually operable linkage for controlling the operation of a hydrostatic transmission among neutral, forward and reverse driving conditions, comprising: a core plate mounted for pivotal movement about a fixed axis in opposite first and second directions from a neutral position, wherein said neutral transmission condition is established, to first and second sets of positions respectively wherein said forward and reverse driving conditions of the transmission are established, the speed of the transmission increasing as the angular distance of the core plate increases from the neutral position and friction producing means engaging said core plate for increasingly resisting the movement of said core plate as the angular displacement of the latter from its neutral position increases in said first and second directions.

7. The manually operable linkage defined in claim 6 wherein said core plate has first and second relatively flat sides facing in axially opposite directions relative to said axis; said core plate being mounted for axial movement along said axis; said friction producing means including first and second oppositely facing bearing surface means respectively integral with the first and second sides of the core plate, a fixed base member having a third bearing surface means disposed for engagement by said first bearing surface means; a pressure applying member axially shiftably mounted on said axis adjacent said second side of said first member and having fourth bearing surface means disposed for engaging said second bearing surface means; and biasing means acting on said pressure applying member and urging the latter towards said first and base members and causing engagement of said first and third bearing surface means and engagement of said fourth and second bearing surface means.

8. A manually operable linkage for controlling the operation of a hydrostatic transmission among neutral, forward and reverse driving conditions, comprising: a first member mounted for movement along a predetermined path in opposite directions from a neutral position, wherein a corresponding neutral condition is established in the transmission, to first and second sets of positions respectively wherein forward and reverse driving conditions are established in the transmission, the speed of the transmission increasing as the displacement of the first member from its neutral position increases; a second member being fixed alongside said first member, said first and second members having respective bearing surfaces in engagement with each other so as to define frictional resistance means configured and arranged for increasingly resisting movement of the first member as the first member moves increasing distances away from its neutral position.

9. A manually operable linkage for controlling the operation of a hydrostatic transmission among neutral, forward and reverse driving conditions having a member mounted for pivotal movement about a fixed axis in opposite directions from a neutral position, whereat the neutral condition is established in the transmission, to a forward and a reverse position, whereat the forward and reverse conditions respectively are established in the transmission, the speed of the transmission increasing as the pivot angle of the member from its neutral position increases, a further member disposed alongside the pivotal member and angularly fixed relative to the neutral position, the members being biased into contact at respective abutment surfaces thereof, the surfaces being arranged so that resistance to movement of the abutment surface of the pivotal member changes at least in one direction as the pivot angle increases from the neutral position.

10. A linkage according to claim 9 in which the said resistance to movement is frictional resistance between the contacting surfaces, and the abutment surfaces are arranged so that respective portions only of the surfaces are in contact and the distance of the location of the contacting portions from the said axis changes as the pivot angle increases.

11. A manually operable linkage according to claim 10 in which the abutment surfaces are arranged so that the said resistance increases, the said distance increasing as the pivot angle increases.

12. A linkage according to claim 10 in which a said abutment surface is rectangular and the co-operating abutment surface is V-shaped.

13. A linkage according to claim 12 in which the rectangular abutment surface is on the pivotal member.

14. A linkage according to claim 13 in which the pivotal member has a further abutment surface located diametrically opposite to its said abutment surface in relation to the axis and the angularly fixed member has a further abutment surface correspondingly located.

15. A linkage according to claim 14 including a third member which is mounted for axial movement along the said axis and which is in abutment with the pivotal member on the opposite side of the pivotal member to the angularly fixed member, the axially movable member being biased into contact with the pivotal member and angularly fixed, and the pivotal member being axially movable, so that the pivotal member is sandwiched between the other members, and which third member has an abutment surface or surfaces corresponding to the abutment surface or surfaces of the said angularly fixed member and co-operating with a further abutment surface or surfaces on the pivotal member corresponding to its said abutment surface or surfaces.

* * * * *